(12) United States Patent
Niergarth et al.

(10) Patent No.: US 10,100,736 B2
(45) Date of Patent: Oct. 16, 2018

(54) GAS TURBINE ENGINE SUMP HEAT EXCHANGER

(71) Applicant: General Electric Company, Schenectady, NY (US)

(72) Inventors: Daniel Alan Niergarth, Cincinnati, OH (US); Brandon Wayne Miller, Liberty Township, OH (US); Christopher James Kroger, West Chester, OH (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 14/927,536

(22) Filed: Oct. 30, 2015

(65) Prior Publication Data
US 2017/0122206 A1    May 4, 2017

(51) Int. Cl.
*F02C 7/14* (2006.01)
*F02C 7/10* (2006.01)
*F01D 25/18* (2006.01)

(52) U.S. Cl.
CPC ............... *F02C 7/14* (2013.01); *F01D 25/18* (2013.01); *F02C 7/10* (2013.01); *F05D 2260/213* (2013.01); *Y02T 50/676* (2013.01)

(58) Field of Classification Search
CPC ...... F02C 7/36; F02C 7/14; F02C 7/10; F01D 25/18; F01D 25/12; Y02T 50/676
See application file for complete search history.

(56) References Cited

U.S. PATENT DOCUMENTS

| 2,571,166 | A | * | 10/1951 | Rossetto | F01D 25/18 184/6.11 |
| 3,043,560 | A | * | 7/1962 | Varadi | F01D 25/12 416/174 |
| 4,722,666 | A | * | 2/1988 | Dennison | A61M 1/101 416/174 |
| 5,408,965 | A | | 4/1995 | Fulton et al. | |
| 5,544,700 | A | | 8/1996 | Shagoury | |

(Continued)

FOREIGN PATENT DOCUMENTS

| GB | 937826 A | 9/1963 |
| GB | 1 357 112 A | 6/1974 |

(Continued)

OTHER PUBLICATIONS

Extended European Search Report and Opinion issued in connection with corresponding EP Application No. 16196259.2 dated Apr. 6, 2017.

*Primary Examiner* — Logan Kraft
*Assistant Examiner* — Elton Wong
(74) *Attorney, Agent, or Firm* — General Electric Company; Pamela Kachur

(57) ABSTRACT

A gas turbine engine includes a compressor section in series flow with a turbine section. The compressor section includes one or more compressors and the turbine section includes one or more turbines, the compressor section and turbine section together defining a core air flowpath. A sump is positioned inward of the core air flowpath for containing and collecting lubrication oil. Additionally, a heat exchanger is positioned in direct thermal communication with the sump for removing heat from lubrication oil contained therein to reduce a size and/or amount of heat exchangers located radially outward of the core air flowpath.

11 Claims, 8 Drawing Sheets

(56) References Cited

U.S. PATENT DOCUMENTS

| | | | |
|---|---|---|---|
| 5,645,397 A * | 7/1997 | Soechting | F01D 5/187 |
| | | | 415/115 |
| 6,217,758 B1 | 4/2001 | Lee | |
| 8,585,358 B2 | 11/2013 | Matsuo et al. | |
| 2005/0236139 A1 | 10/2005 | Konruff et al. | |
| 2006/0042223 A1* | 3/2006 | Walker | F01D 9/065 |
| | | | 60/39.08 |
| 2007/0022732 A1* | 2/2007 | Holloway | F02C 7/14 |
| | | | 60/39.08 |
| 2009/0134243 A1* | 5/2009 | Mount | F01D 25/18 |
| | | | 239/265.27 |
| 2010/0180571 A1* | 7/2010 | Zysman | F02C 7/14 |
| | | | 60/204 |
| 2014/0010639 A1* | 1/2014 | Snape | F01D 25/18 |
| | | | 415/177 |
| 2014/0205446 A1 | 7/2014 | Patsouris et al. | |
| 2014/0271118 A1 | 9/2014 | Junod | |
| 2015/0125264 A1 | 5/2015 | Lighty et al. | |
| 2017/0130606 A1* | 5/2017 | Niergarth | F01D 25/125 |

FOREIGN PATENT DOCUMENTS

| | | |
|---|---|---|
| GB | 1 358 076 A | 6/1974 |
| WO | 02/38938 A1 | 5/2002 |

* cited by examiner

GAS TURBINE ENGINE SUMP HEAT EXCHANGER

FIELD OF THE INVENTION

The present subject matter relates generally to a gas turbine engine, or more particularly to a gas turbine engine having an engine sump heat exchanger.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. The compressor section, combustion section, turbine section, and exhaust section together define a core air flowpath.

The compressor section and the turbine section are generally coupled through one or more shafts or spools. Additionally, rotation of certain components of the compressor section, turbine section, and the one or more shafts or spools is facilitated by a plurality of bearings. These bearings are provided with lubrication oil throughout operation of the gas turbine engine to, e.g., remove heat from such bearings and reduce an amount of friction within such bearings.

Gas turbine engines generally include a lubrication oil circulation assembly for providing lubrication oil to each of the plurality of bearings, for pumping out, or scavenging, lubrication oil from one or more sumps provided for collecting and/or containing such lubrication oil, and for removing heat from such lubrication oil. The lubrication oil circulation assembly typically includes a pump positioned outside of the core air flowpath, one or more supply lines and scavenge lines extending through the core air flowpath to reach, e.g., the bearings and the one or more sumps, and one or more heat exchangers also positioned outside of the core air flowpath.

However, the heat exchangers can occupy a relatively large footprint outside of the core air flowpath, which may reduce an available area for other components. Accordingly, a means for reducing a size of the heat exchangers for the circulation assembly located outside of the core air flowpath would be useful. More particularly, a means for reducing a size of the heat exchangers for the circulation assembly located outside of the core air flowpath while still providing a desired amount of heat transfer would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aeronautical gas turbine engine is provided. The gas turbine engine includes a compressor section including one or more compressors, and a turbine section located downstream of the compressor section and including one or more turbines. The compressor section and the turbine section together define a core air flowpath. The gas turbine engine also includes a sump positioned inward of the core air flowpath for containing and collecting lubrication oil, and a heat exchanger positioned in direct thermal communication with the sump for removing heat from the lubrication oil contained therein.

In another exemplary embodiment of the present disclosure, an aeronautical gas turbine engine is provided. The gas turbine engine includes a compressor section including one or more compressors, and a turbine section located downstream of the compressor section and including one or more turbines. The compressor section and the turbine section together define a core air flowpath. The gas turbine engine also includes a sump positioned inward of the core air flowpath for containing and collecting lubrication oil, and a heat exchanger positioned at least partially within the sump or integrated into a wall of the sump or for removing heat from the lubrication oil contained therein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
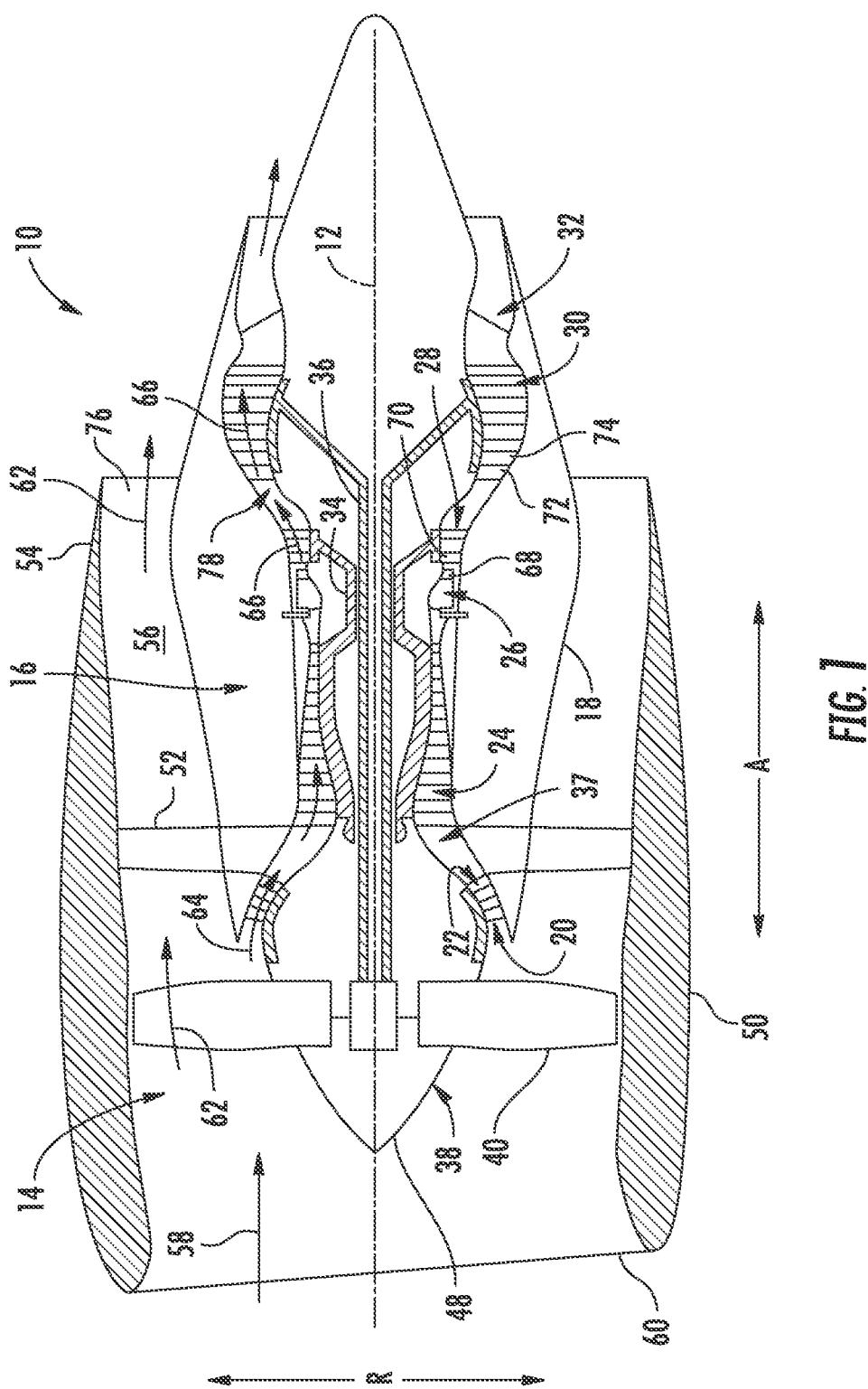
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38 having a plurality of fan blades 40. A rotatable front hub 48 that is aerodynamically contoured to promote an airflow through the plurality of fan blades 40 is positioned at a forward end of the fan section 14. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is provided by way of example only, and that in other exemplary embodiments, the turbofan engine 10 may have any other suitable configuration. For example, in other embodiments, the turbofan engine 10 may be configured as a geared turbofan engine, such that the LP shaft 36 drives the fan 38 across a power gearbox. Additionally, or alternatively, the turbofan engine 10 may be an unducted/open rotor turbofan engine. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
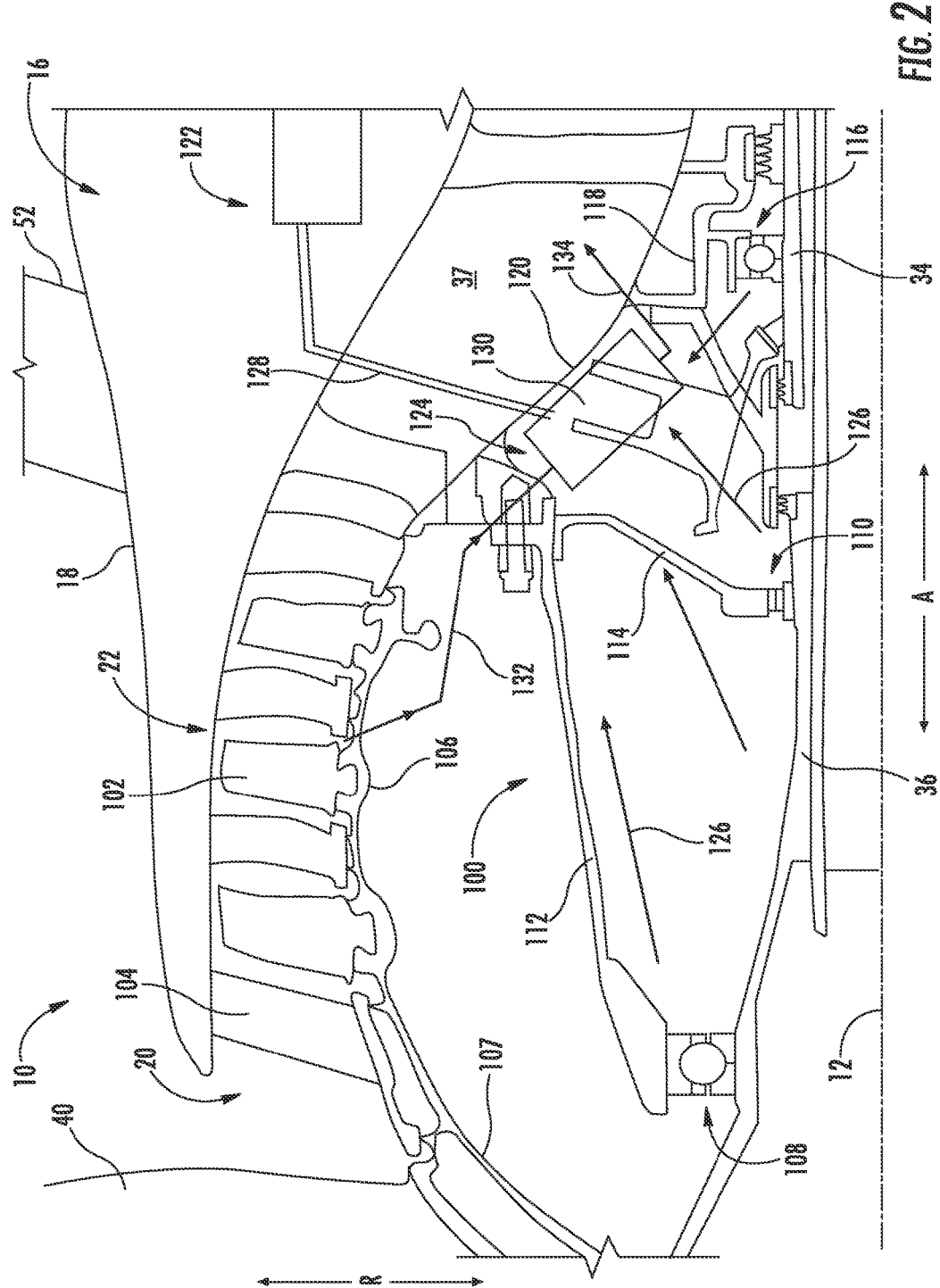
FIG. 2 is a schematic, cross-sectional view of a forward end of a core of the exemplary gas turbine engine of FIG. 1.

Referring now to FIG. 2, a schematic, cross-sectional view of a forward end of the turbofan engine 10 of FIG. 1 is provided. Specifically, FIG. 2 provides a close-up, cross-sectional view of a forward sump 100 of the turbofan engine 10.

For the embodiment depicted, the forward sump 100 is positioned radially inward from the core air flowpath 37, or more particularly, radially inward from a portion of the core air flowpath 37 extending through the LP compressor 22 of the compressor section. The LP compressor 22 is configured to receive a flow of air from the fan 38 through the inlet 20 and compress such air using a plurality of rotating LP compressor rotor blades 102. The LP compressor 22 depicted also includes an inlet guide vane 104 positioned proximate the inlet 20, forward of the plurality of LP compressor rotor blades 102. The plurality of LP compressor rotor blades 102 are coupled at a radially inner end to a drum-type LP compressor rotor 106. The LP compressor rotor 106 is attached to a structural member 107, which extends forward and connects to one or more rotational components of the fan section 14. Notably, as discussed above, the LP shaft 36 is driven by the LP turbine 30, and in turn drives the fan 38, and the plurality of fan blades 40, along with the LP compressor 22.

Additionally, a first forward LP bearing assembly 108 and a second forward LP bearing assembly 110 are provided to stabilize the LP shaft 36 at a forward end and to facilitate rotation of the LP shaft 36. The first forward LP bearing assembly 108 is attached at a radially inner end to the LP shaft 36 and at a radially outer end to a forward LP frame member 112. Similarly, the second forward LP bearing assembly 110 is attached at a radially inner end to the LP shaft 36 and a radially outer end to an aft LP frame member 114. The forward and aft LP frame members 112, 114 are each stationary frame members. Moreover, for the embodiment depicted, the first forward LP bearing assembly 108 is positioned forward of the second forward LP bearing assembly 110 and includes a ball bearing. By contrast, the second forward LP bearing assembly 110 includes a roller bearing. However, in other exemplary embodiments, any other suitable bearings may be included with the first and/or second forward LP bearing assemblies 108, 110. Additionally, in other exemplary embodiments, any other suitable bearing configuration may be provided to facilitate rotation of the LP shaft 36. For example, in other exemplary embodiments, a single bearing or any combination of roller bearing, ball bearing, tapered roller bearing, or other bearing(s) may form an assembly to facilitate rotation of the LP shaft 36 at the forward end.

As is also depicted, an HP shaft 34 is concentric with the LP shaft 36 and positioned radially outward of the LP shaft 36. The HP shaft 34 is rotated by the HP turbine 28 and is configured to drive the HP compressor 24 (see FIG. 1). A forward HP bearing assembly 116 is provided to facilitate rotation of the HP shaft 34 at a forward end of the HP shaft 34. Specifically, a radially inner end of the forward HP bearing assembly 116 is attached to the HP shaft 34 and a radially outer end of the forward HP bearing assembly 116 is attached to a stationary HP frame member 118. For the embodiment depicted, the forward HP bearing assembly 116 includes a single ball bearing. However, in other embodiments, the forward HP bearing assembly 116 may additionally include one or more other bearings positioned at any suitable location. Additionally or alternatively, in other embodiments, any other suitable bearing, or combination of bearings, may be included with the forward HP bearing assembly 116 to facilitate rotation of the HP shaft 34.

Referring still to FIG. 2, the first forward LP bearing assembly 108, second forward LP bearing assembly 110, and forward HP bearing assembly 116 are all positioned at least partially within the forward sump 100 of the turbofan engine 10. The forward sump 100 is located radially inward of the core air flowpath 37 and is defined at least in part by certain stationary frame members of the core 16, such as the forward LP frame member 112, the stationary HP frame member 118, and a radially inner liner 120 defining a portion of the core air flowpath 37 between the LP compressor 22 and the HP compressor 24. Additionally, the exemplary forward sump 100 depicted is defined at a radially inner side by a portion of the LP shaft 36 and the HP shaft 34.

Lubrication oil may be provided to the forward sump 100, or more particularly to the plurality of bearings positioned at least partially within the forward sump 100, to remove heat from such bearings and reduce an amount of friction within such bearings. For example, the turbofan engine 10 may include a lubrication oil circulation assembly 122 having one or more pumps and one or more supply lines for providing lubrication oil to the plurality of bearings (not shown). As is depicted schematically, the one or more pumps of the lubrication oil circulation assembly 122 are positioned radially outward of the core air flowpath 37. The supply lines (not shown) may extend from the one or more pumps of the circulation assembly 122 through the core air flowpath 37 and to the plurality of bearings—e.g., first and second forward LP bearings 108, 110 and forward HP bearings 116.

Once the lubrication oil is provided to the plurality of bearings, the lubrication oil may absorb an amount of heat generated by the respective bearings while reducing the amount of friction in such bearings. The forward sump 100 is provided to contain and collect the lubrication oil that has been provided to the plurality of bearings positioned at least partially therein. Additionally, the forward sump 100 depicted defines a collection chamber 124 wherein the lubrication oil is configured to flow and collect after having passed over or through the plurality of bearings. The flow of lubrication oil from the plurality of bearings is indicated by arrows 126 in FIG. 2. Once in the collection chamber 124, the circulation assembly 122 is configured to pump out or scavenge such lubrication oil through a scavenge line 128 in fluid communication with the sump and extending through the core air flowpath 37.

However, prior to such lubrication oil being scavenged out of the forward sump 100, a temperature of such lubrication oil is reduced through a heat exchanger 130—the heat exchanger 130 positioned in direct thermal communication with the forward sump 100 for removing heat from the lubrication oil contained therein. For the embodiment depicted, the heat exchanger 130 is positioned at least partially within the forward sump 100, or more particularly, is positioned as partially within the collection chamber 124 defined by the forward sump 100. Accordingly, the heat exchanger 130 may reduce a temperature of the lubrication oil prior to such lubrication oil being scavenged out via the scavenge line 128 of the circulation assembly 122.

For the embodiment depicted, the heat exchanger 130 is configured as an air-to-liquid heat exchanger 130. Specifically, the heat exchanger 130 is configured to receive a cooling airflow 132 from the compressor section and to transfer heat from the lubrication oil in the forward sump 100 to such cooling airflow 132. The cooling airflow 132, after having absorbed an amount of heat from the lubrication oil within the forward sump 100, i.e., an exhaust airflow 134, is then exhausted back into the core air flowpath 37. However, in other exemplary embodiments, the exhaust airflow 134 may instead be exhausted to any other suitable location. For example, in other exemplary embodiments, such exhaust airflow 134 may be exhausted, e.g., to the bypass passage 56 (FIG. 1), or to atmosphere. Notably, although for the embodiment depicted the cooling airflow 132 provided from the compressor section is provided from a location proximate a second stage of LP compressor rotor blades 102, in other embodiments, the cooling airflow 132 may be provided from any other suitable location within the LP compressor 22. Alternatively, the cooling airflow 132 may be provided from a location upstream from the LP compressor 22 or downstream from the LP compressor 22. Moreover, as will be described in greater detail below, in still other exemplary embodiments, the cooling airflow 132 may additionally, or alternatively, be provided directly from the fan 38. Further still, although for the embodiment depicted the cooling airflow 132 is depicted being extracted from a location in the core air flowpath 37 upstream from where the exhaust airflow 134 is being exhausted (i.e., a higher pressure location), in other exemplary embodiments, the cooling airflow 132 may be extracted from a location in the core air flowpath 37 downstream from where the exhaust airflow 134 is being exhausted (i.e., a lower pressure location). For example, in other exemplary embodiments, the airflow directions through the heat exchanger 130 depicted in FIG. 2 may be reversed.

Figure 3:
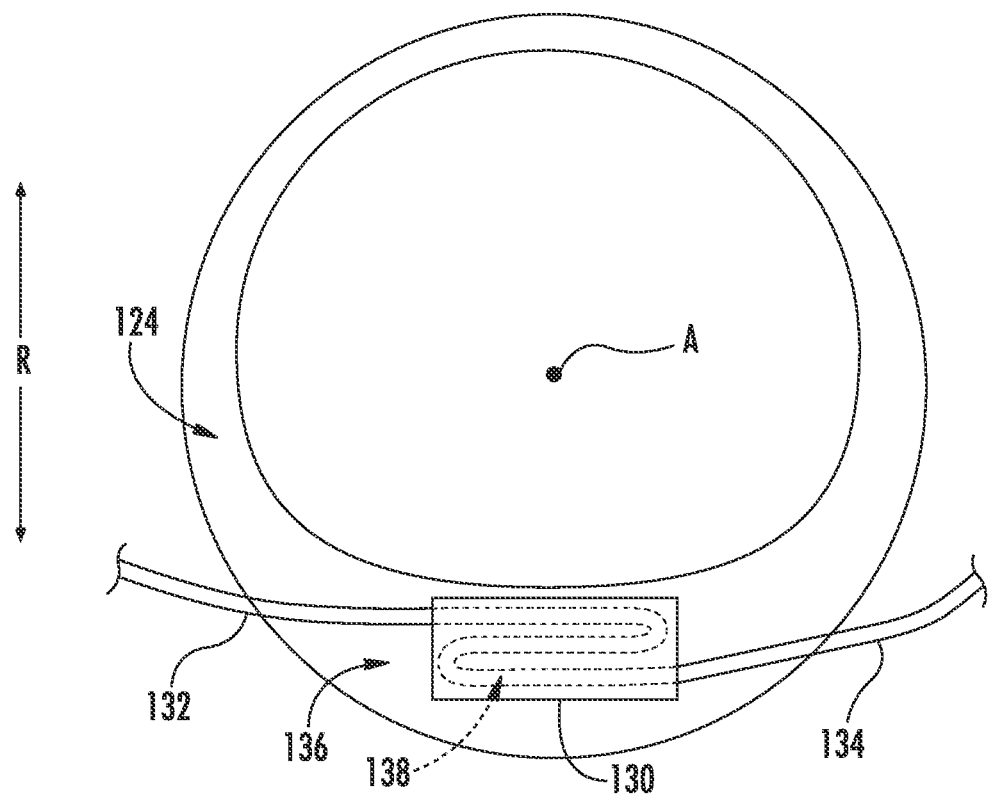
FIG. 3 is a cross-sectional, schematic view of a collection chamber of a sump in accordance with an exemplary embodiment of the present disclosure.

The turbofan engine 10 may include a single heat exchanger 130 positioned in direct thermal communication with the forward sump 100 for removing an amount of heat from the lubrication oil within such sump 100 before such lubrication oil is scavenged out. For example, referring now also to FIG. 3, an axial, cross-sectional view is provided of the collection chamber 124 defined by the exemplary forward sump 100 of FIG. 2. As shown, the collection chamber 124 defined by the exemplary forward sump 100 generally includes an enlarged portion proximate a bottom portion of the forward sump 100. The enlarged portion, which is referred to herein as a "bathtub" 136, may be positioned at a bottom portion of the forward sump 100, such that gravity may assist with the collection of lubrication oil therein. For the embodiment depicted, the heat exchanger 130 is configured as a single heat exchanger positioned within the bathtub 136 of the forward sump 100. Additionally, for the embodiment depicted, the heat exchanger 130 generally includes a plurality of channels 138 extending at least partially through the forward sump 100, with the cooling medium (e.g., the cooling airflow 132 from the compressor section, or one or more liquids discussed below) flowing therethrough.

It should be appreciated, however, that in other exemplary embodiments, the turbofan engine 10 may additionally include any other suitable number and/or configuration of heat exchangers. For example, in other exemplary embodiments, the turbofan engine 10 may include a plurality of heat exchangers circumferentially spaced and/or axially spaced within the collection chamber 124 of the forward sump 100 or elsewhere in direct thermal communication with the forward sump 100.

Figure 4:
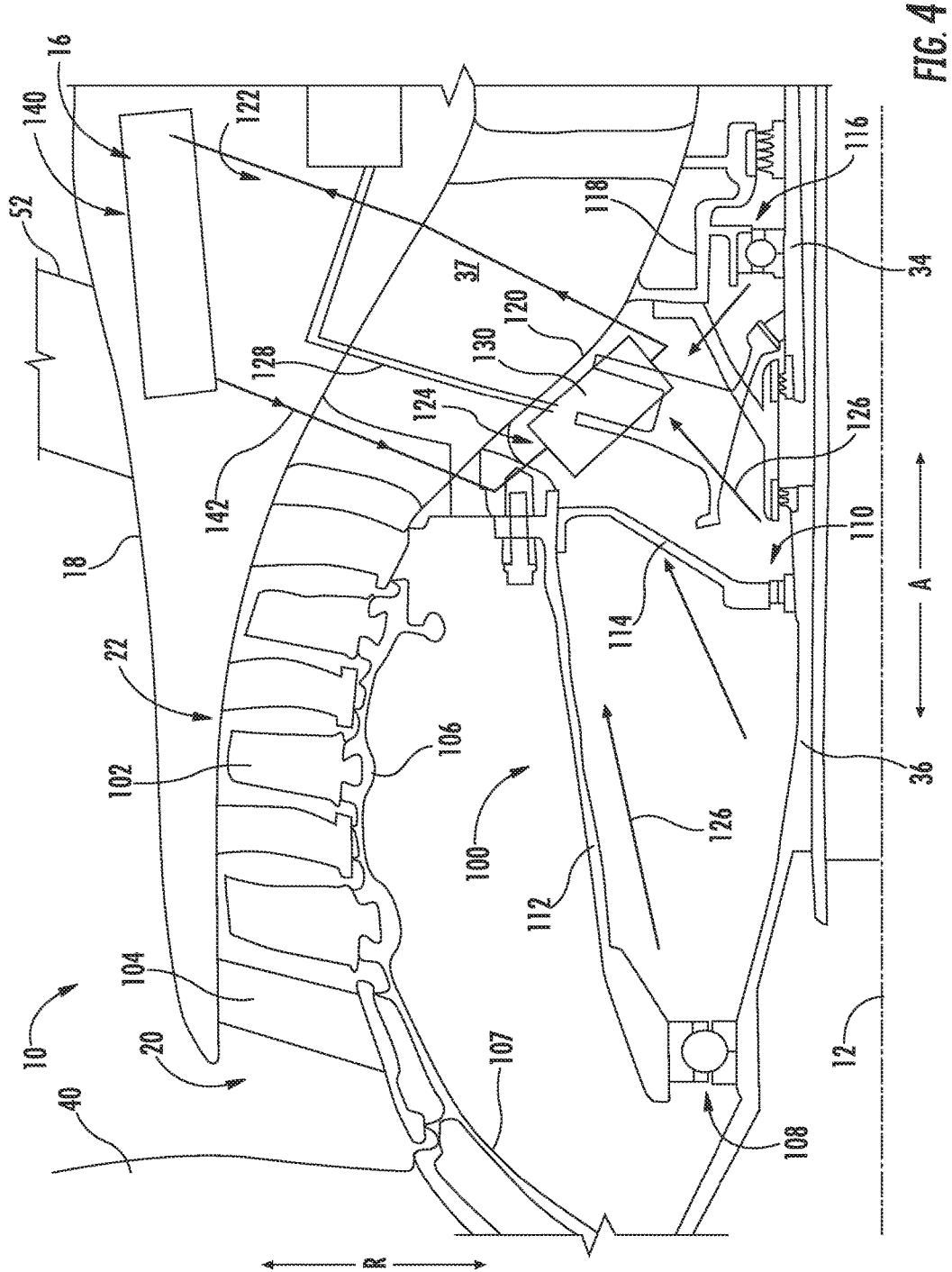
FIG. 4 is a schematic, cross-sectional view of a forward end of a core of a gas turbine engine in accordance with another exemplary embodiment of the present disclosure.

Referring now to FIG. 4, a schematic, cross-sectional view of a forward end of a turbofan engine 10 in accordance with another exemplary embodiment of the present disclosure is provided. The exemplary turbofan engine 10 of FIG. 4 may be configured in substantially the same manner as the exemplary turbofan engine 10 described above with reference to FIGS. 1 through 3. Accordingly, the same or similar numbering may refer to the same or functionally equivalent components.

As shown, the exemplary turbofan engine 10 includes a first forward LP bearing assembly 108 and a second forward LP bearing assembly 110, each supporting rotation of an LP shaft 36 at a forward end. The first and second forward LP bearing assemblies 108, 110 are attached at radially inner ends to the LP shaft 36 and at radially outer ends to forward and aft LP frame members 114, 116, respectively. Additionally, the turbofan engine 10 includes a forward HP bearing assembly 116 for supporting rotation of the HP shaft 34 at a forward end. The forward HP bearing assembly 116 is attached to the HP shaft 34 at a radially inner end and to a stationary HP frame member 118 at a radially outer end. Moreover, the various bearing assemblies are each positioned at least partially within a forward sump 100 positioned radially inward from the core air flowpath 37.

The forward sump 100 depicted in FIG. 4 operates in substantially the same manner as the forward sump 100 depicted in FIG. 2, in that the forward sump 100 depicted in FIG. 4 includes a heat exchanger 130 positioned at least partially within a collection chamber 124 of the sump 100. However, instead of the heat exchanger 130 being configured as an air-to-liquid heat exchanger, for the exemplary turbofan engine 10 of FIG. 4, the heat exchanger 130 is configured as a liquid-to-liquid heat exchanger. More particularly, for the embodiment depicted, the heat exchanger 130 is configured as part of a closed-loop thermal transport system 140 for removing heat from the lubrication oil positioned within the forward sump 100 of the turbofan engine 10. The closed loop thermal transport system 140 may circulate a thermal transport fluid through various heat source heat exchangers and heat sink heat exchangers arranged in series and/or parallel flow. Notably, the heat exchanger 130 positioned at least partially within the forward sump 100 is considered a heat source heat exchanger of the thermal transport system 140, as it is removing heat from the lubrication oil and adding heat to the thermal transport system 140, or rather to the thermal transport fluid circulated within the closed loop thermal transport system 140.

Figure 5:
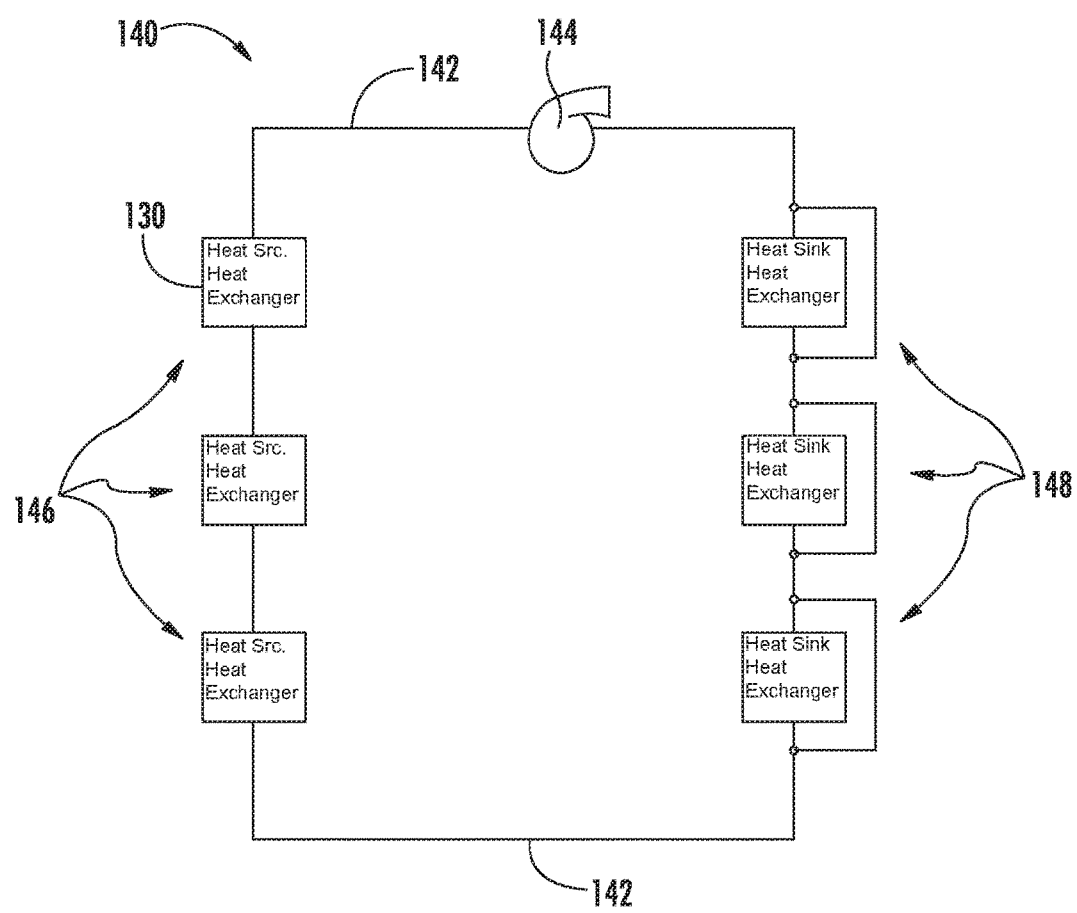
FIG. 5 is a schematic view of a closed loop thermal transport system in accordance with an exemplary embodiment of the present disclosure.

Referring now also briefly to FIG. 5, a schematic view of an exemplary closed loop thermal transport system 140 is provided. The exemplary closely thermal transport system 140 generally includes a thermal transport bus 142 having the thermal transport fluid flowing therethrough. The thermal transport system 140 additionally includes a pump 144 for generating a flow of the thermal transport fluid through the thermal transport bus 142. Further, a plurality of heat source exchangers 146 are provided in thermal communication with the heat exchange fluid in the thermal transport bus 142. For the embodiment depicted, the plurality of heat source exchangers 146 are depicted in series flow along the thermal transport bus 142. However, in other embodiments, the plurality of heat source exchangers 146 may additionally, or alternatively, be configured in parallel flow. Notably, for the embodiment depicted, the heat exchanger 130 that is positioned in direct thermal communication with the forward sump 100 of the turbofan engine 10 depicted in FIG. 4 is configured as one of the heat source exchangers 146 of the closed loop thermal transport system 140.

Located downstream of the plurality of heat source exchangers 146, are a plurality of heat sink exchangers 148 permanently or selectively in thermal communication with the heat exchange fluid in the thermal transport bus 142. Accordingly, during operation, the closed-loop thermal transport system 140 may collect heat from the various heat source exchangers 146 and transport such heat via the thermal transport fluid flowing through the thermal transport bus 142 to the one or more heat sink exchangers 148 to, e.g., more efficiently remove heat from the various systems. In certain exemplary embodiments, the closed loop thermal transport system 140 depicted in FIGS. 4 and 5 may be configured in substantially the same manner as the thermal management system 100 discussed in U.S. application Ser. No. 14/814,546, filed on Jul. 31, 2015, which is incorporated fully herein by reference for all relevant matters. For example, in certain exemplary embodiments, the plurality of heat source exchangers 146 may additionally include one or more of an environmental control system precooler, a generator lubrication system heat exchanger, an electronics cooling system heat exchanger, a compressor cooling air system heat exchanger, or an active clearance control system heat exchanger. Additionally, in certain exemplary embodiments, the plurality of heat sink heat exchangers 148 may include one or more of a RAM heat exchanger, a fuel heat exchanger, and a fan stream heat exchanger.

It should be appreciated, however, that in other exemplary embodiments, the liquid-to-liquid heat exchanger may not be configured as part of the closed-loop thermal transport system 140, and instead may be configured as part of any other suitable liquid-to-liquid heat exchanger. For example, in other embodiments, the heat exchanger may utilize fuel as the cooling medium, de-oxygenated fuel as the cooling medium, or oil as the cooling medium.

Figure 6:
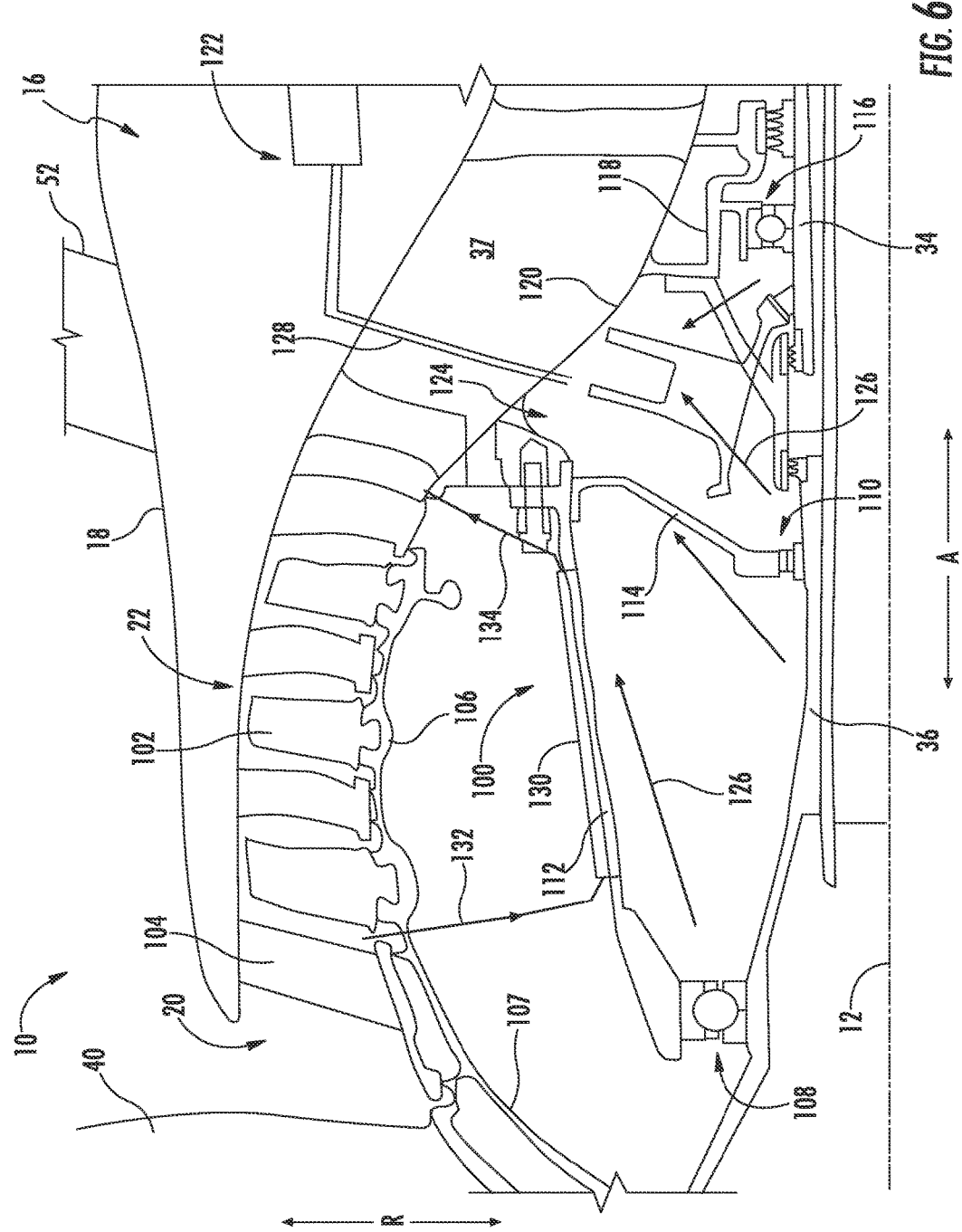
FIG. 6 is a schematic, cross-sectional view of a forward end of a core of a gas turbine engine in accordance with yet another exemplary embodiment of the present disclosure.

Referring now to FIG. 6, a schematic, cross-sectional view of a forward end of a turbofan engine 10 in accordance with another exemplary embodiment of the present disclosure is provided. The exemplary turbofan engine 10 of FIG. 6 may be configured in substantially the same manner as the exemplary turbofan engine 10 described above with reference to FIG. 2. Accordingly, the same or similar numbering may refer to the same or functionally equivalent components.

As shown, the exemplary turbofan engine 10 includes a first forward LP bearing assembly 108 and a second forward LP bearing assembly 110 supporting rotation of an LP shaft 36 at a forward end. The first and second forward LP bearing assemblies 108, 110 are attached at radially inner ends to the LP shaft 36 and at radially outer ends to forward and aft LP frame members 112, 114, respectively. Additionally, the turbofan engine 10 includes a forward HP bearing assembly 116 for supporting rotation of an HP shaft 34 at a forward end. The forward HP bearing assembly 116 is similarly attached to the HP shaft 34 at a radially inner end and to a stationary HP frame member 118 at a radially outer end. Moreover, the various bearing assemblies are each positioned at least partially within a forward sump 100 positioned radially inward from the core air flowpath 37.

The forward sump 100 depicted in FIG. 6 operates in substantially the same manner as the forward sump 100 depicted in FIG. 2. However, instead of including a heat exchanger 130 positioned at least partially within the forward sump 100, the exemplary heat exchanger 130 of FIG. 6 is positioned directly in thermal communication with the forward sump 100 by being integrated into a wall of the forward sump 100. More particularly, the exemplary heat exchanger 130 depicted in FIG. 6 is integrated into the forward LP frame member 112 that at least partially defines the forward sump 100.

The exemplary heat exchanger 130 of FIG. 6 may be integrated into the wall of the forward sump 100 in any suitable manner. For example, the heat exchanger 130 may include a plurality of channels defined in the wall of the forward sump 100, with a cooling medium flowing therethrough. Notably, for the embodiment depicted, the heat exchanger 130 integrated into the wall of the forward sump 100 is configured as an air-to-liquid heat exchanger receiving a cooling airflow 132 from the compressor section of the turbofan engine 10. The cooling airflow 132 from the compressor section may flow through the one or more channels defined in the wall of the sump (i.e., the heat exchanger 130) to absorb an amount of heat from the lubrication oil positioned within the forward sump 100. The exemplary heat exchanger 130 depicted may be particularly apt at absorbing heat from the lubrication oil flowing from the first forward LP bearing assembly 108 towards the collection chamber 124 of the forward sump 100. In certain exemplary embodiments, the flow of air through the heat exchanger 130 may be extracted from and exhausted to locations substantially similar to the locations described above with reference to the embodiment of FIG. 2.

However, in other embodiments, the heat exchanger 130 may be integrated into the wall of the forward sump 100 in any other suitable manner. For example, in other embodiments, the heat exchanger 130 may be integrated into the wall of the forward sump 100 by attaching a plurality of cooling channels to an outside surface of the wall of forward sump 100 or alternatively to an inside surface of the wall of the forward sump 100. Additionally, although the exemplary heat exchanger 130 is depicted being integrated into the forward LP frame member 112, in other embodiments, the heat exchanger 130 may additionally, or alternatively, be integrated into any other exterior wall defining the forward sump 100, or interior wall positioned within the forward sump 100. Moreover, in still other embodiments, the heat exchanger 130 may not be configured as a gas-to-liquid heat exchanger, and instead may be configured as a liquid-to-liquid heat exchanger.

A turbofan configured in accordance with one or more of the embodiments described above may allow for less/small heat exchangers to be included as part of the circulation assembly located radially outward of the core air flowpath, as the heat exchanger located in direct thermal communication with the sump will remove at least a portion of the amount of heat required to be removed from such lubrication oil. Accordingly, with such a configuration, more room may be provided within the core of the engine (radially outward of the core air flowpath) for other components that desirably are positioned therein. Further, depending on an efficiency of the heat exchanger in direct thermal communication with the sump, in certain embodiments, inclusion of the heat exchanger in direct thermal communication with the sump may allow for the entire lubrication oil circulation assembly to be relocated inward of the core air flowpath, such that no lubrication oil supply lines and/or scavenge lines extend through the core air flowpath.

It should be appreciated that the particular embodiments described above with reference to FIGS. 1 through 6 are provided by way of example only. For example, as mentioned above, aspects of the present disclosure may be incorporated into any other suitable turbofan engine—or other suitable gas turbine engine—and further into any other suitable sump within a gas turbine engine (e.g., an aft sump of a gas turbine engine).

Figure 7:
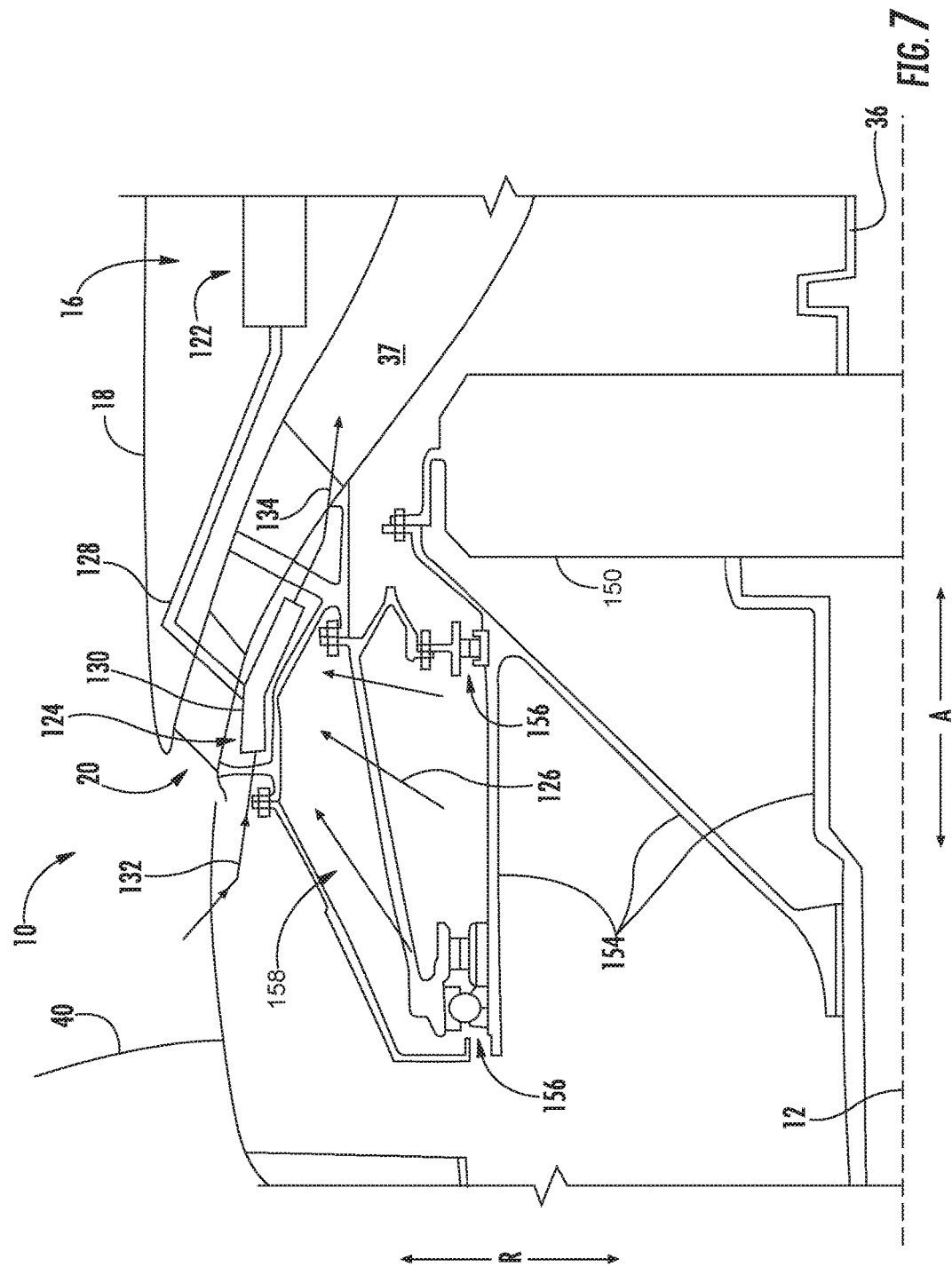
FIG. 7 is a schematic, cross-sectional view of a forward end of a core of a gas turbine engine in accordance with still another exemplary embodiment of the present disclosure.
Figure 8:
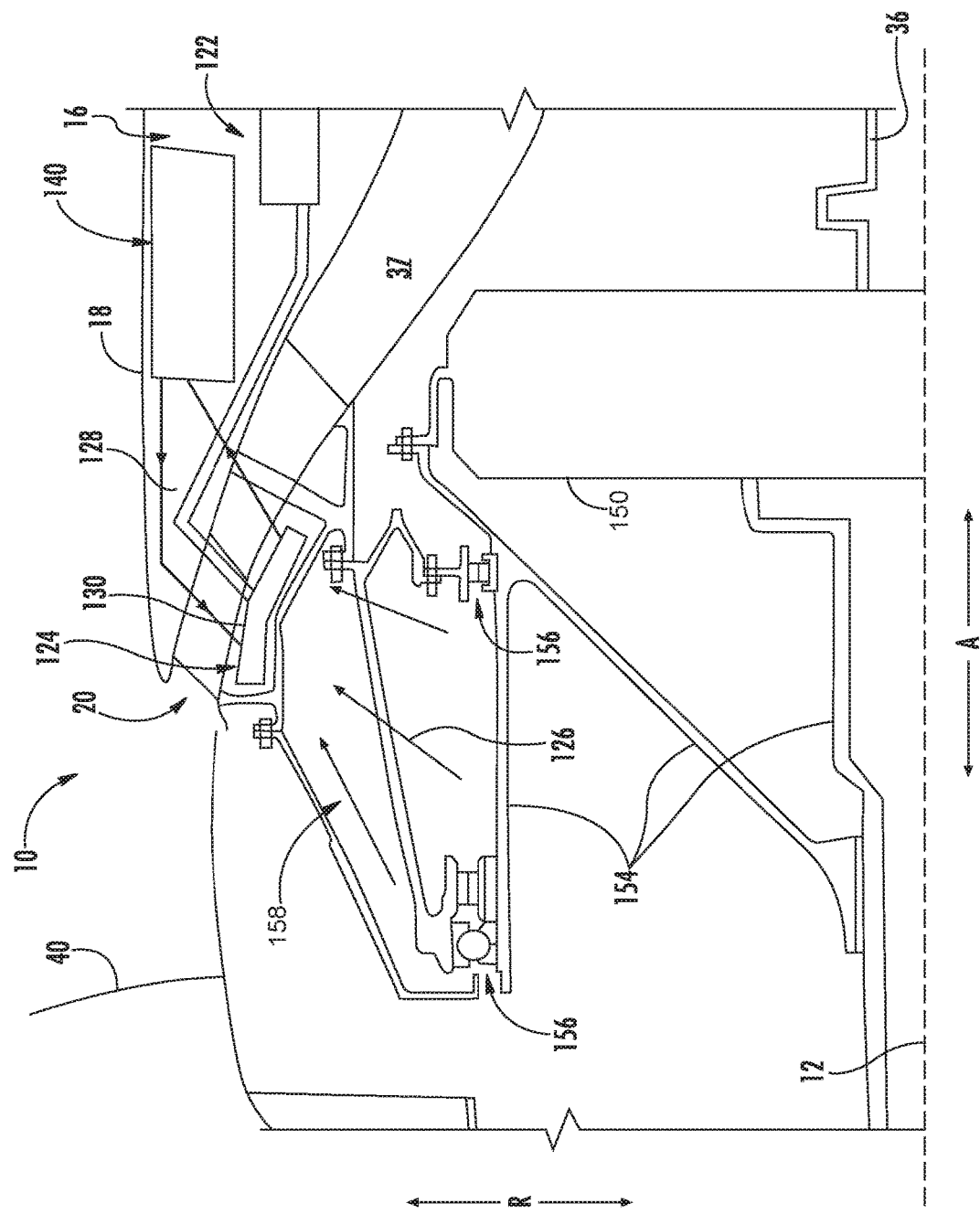
FIG. 8 is a schematic, cross-sectional view of a forward end of a core of a gas turbine engine in accordance with yet another exemplary embodiment of the present disclosure.

For example, referring now to FIGS. 7 and 8, various embodiments of the turbofan engine 10 in accordance with other exemplary aspects of the present disclosure are provided. Specifically, FIGS. 7 and 8 provide schematic, cross-sectional views of a forward end of turbofan engines 10 incorporating exemplary aspects of the present disclosure.

The exemplary turbofan engines 10 depicted in FIGS. 7 and 8 are configured as geared turbofan engines 10. More particularly, the turbofan engines 10 of FIGS. 7 and 8 each include a fan 38 rotatable by an LP shaft 36 across a power gear box 150. The power gear box 150 is configured to step down a rotational speed of the LP shaft 36 to a more efficient rotational speed for the fan 38.

As the turbofan engines 10 are geared turbofan engines, the turbofan engines 10 additionally include a fan shaft 154 mechanically coupled to the power gear box 150 for rotating a plurality of fan blades 40 of the fan 38. Rotation of the fan shaft 154 is supported by a plurality of bearings 156 positioned at least partially within a fan bearing sump 158. As with the exemplary forward sump 100 described above with reference to, e.g., FIG. 2, the exemplary fan bearing sump 158 is configured to receive lubrication oil from a lubrication oil circulation assembly 122. Further, lubrication oil within the fan bearing sump 158 is configured to collect generally in a collection chamber 124 defined by the fan bearing sump 158. The lubrication oil circulation assembly 122 includes a scavenge line 128 configured to remove lubrication oil collected within the collection chamber 124 of the fan bearing sump 158.

As with the above embodiments, the turbofan engines 10 of FIGS. 7 and 8 additionally include a heat exchanger 130 positioned in direct thermal communication with the fan bearing sump 158 for removing heat from the lubrication oil contained therein.

Referring particularly to the embodiment of FIG. 7, the heat exchanger 130 is positioned within the collection chamber 124 the fan bearing sump 158 and is configured as an air-to-liquid heat exchanger. For the embodiment depicted, the heat exchanger 130 is configured to receive a cooling airflow 132 from the fan 38 and further to transfer heat from the lubrication oil within the fan bearing sump 158 to such cooling airflow 132. The cooling airflow 132 after having absorbed heat from the lubrication oil within the heat exchanger 130, i.e., exhaust airflow 134, is exhausted into the core air flowpath 37. However, in other embodiments, the heat exchanger 130 may instead be configured to exhaust such exhaust airflow 134 to any other suitable location.

Alternatively, referring now particularly to the embodiment of FIG. 8, the heat exchanger 130 is also depicted in the collection chamber 124 of the fan bearing sump 158. However, for the embodiment of FIG. 8, the heat exchanger 130 is configured as a liquid-to-liquid heat exchanger 130. The exemplary heat exchanger 130 depicted is further configured with a closed loop thermal transport system 140, such as the exemplary closed loop thermal transport system 140 described above with reference to FIGS. 4 and 5.

Moreover, although not depicted, in still other exemplary embodiments, the exemplary turbofan engine 10 of FIGS. 7 and 8 may additionally, or alternatively, include a heat exchanger 130 integrated into a wall of the fan bearing sump 158 for removing heat from lubrication oil contained within the fan bearing sump 158.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aeronautical gas turbine engine comprising:
a compressor section including one or more compressors;
a turbine section located downstream of the compressor section and including one or more turbines, the compressor section and the turbine section together defining a core air flowpath;
a sump positioned inward of the core air flowpath for containing and collecting lubrication oil; and
a heat exchanger positioned in direct thermal communication with the sump for removing heat from the lubrication oil contained therein, wherein the heat exchanger is positioned within the sump;
a fan, wherein the compressor section is in airflow communication with the fan, wherein the heat exchanger is an air-to-liquid heat exchanger, and wherein the heat exchanger is configured to receive a cooling airflow from at least one of the fan or the compressor section and to transfer heat from the lubrication oil in the sump to such a cooling airflow.

2. The gas turbine engine of claim 1, wherein the sump is a forward sump of the gas turbine engine.

3. The gas turbine engine of claim 1, wherein the sump is a fan bearings sump of the gas turbine engine.

4. The gas turbine engine of claim 1, wherein the heat exchanger is integrated into a wall of the sump.

5. The gas turbine engine of claim 1, wherein the sump defines a collection chamber, and wherein the heat exchanger is positioned at least partially within the collection chamber.

6. The gas turbine engine of claim 1, wherein the heat exchanger comprises a plurality of channels extending at least partially through the sump.

7. The gas turbine engine of claim 1, further comprising a lubrication oil circulation assembly including a scavenge line in fluid communication with the sump and extending through the core air flowpath.

8. An aeronautical gas turbine engine comprising:
a compressor section including one or more compressors;
a turbine section located downstream of the compressor section and including one or more turbines, the compressor section and the turbine section together defining a core air flowpath;
a sump positioned inward of the core air flowpath for containing and collecting lubrication oil;
a heat exchanger positioned within the sump for removing heat from the lubrication oil contained therein; and
a fan, wherein the compressor section is in airflow communication with the fan, wherein the heat exchanger is an air-to-liquid heat exchanger, and wherein the heat exchanger is configured to receive a cooling airflow from at least one of the fan or the compressor and to transfer heat from the lubrication oil in the sump to such cooling airflow.

9. The gas turbine engine of claim 8, wherein the sump is a forward sump of the gas turbine engine.

10. The gas turbine engine of claim 8, wherein the sump is a fan bearings sump.

11. The gas turbine engine of claim 8, wherein the sump defines a collection chamber, and wherein the heat exchanger is positioned at least partially within the collection chamber.

* * * * *